(12) United States Patent
Nagata et al.

(10) Patent No.: US 11,090,902 B2
(45) Date of Patent: Aug. 17, 2021

(54) PRESSURE-SENSITIVE ADHESIVE COMPOSITION, PRESSURE-SENSITIVE ADHESIVE LAYER, PRESSURE-SENSITIVE ADHESIVE-LAYER—ATTACHED POLARIZING FILM, AND IMAGE DISPLAY DEVICE

(71) Applicant: NITTO DENKO CORPORATION, Ibaraki (JP)

(72) Inventors: Mizue Nagata, Ibaraki (JP); Masakuni Fujita, Ibaraki (JP); Yuusuke Toyama, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 15/560,240

(22) PCT Filed: Mar. 29, 2016

(86) PCT No.: PCT/JP2016/060236
§ 371 (c)(1),
(2) Date: Sep. 21, 2017

(87) PCT Pub. No.: WO2016/159003
PCT Pub. Date: Oct. 6, 2016

(65) Prior Publication Data
US 2018/0051188 A1 Feb. 22, 2018

(30) Foreign Application Priority Data
Mar. 30, 2015 (JP) .............................. JP2015-068751

(51) Int. Cl.
*C09J 11/06* (2006.01)
*C09J 133/06* (2006.01)
(Continued)

(52) U.S. Cl.
CPC ................ *B32B 7/02* (2013.01); *B32B 15/02* (2013.01); *B32B 27/308* (2013.01);
(Continued)

(58) Field of Classification Search
CPC .............. C08K 2201/001; B32B 15/02; B32B 2302/202
See application file for complete search history.

(56) References Cited

U.S. PATENT DOCUMENTS

| | | | |
|---|---|---|---|
| 2015/0050853 A1* | 2/2015 | Park ........................... | C09J 7/29 442/1 |
| 2015/0368525 A1* | 12/2015 | Yasui ................... | G02B 5/3025 428/337 |
| 2016/0130478 A1 | 5/2016 | Nagata et al. | |

FOREIGN PATENT DOCUMENTS

| CN | 103980845 A | 8/2014 |
|---|---|---|
| JP | 2003-331654 A | 11/2003 |

(Continued)

OTHER PUBLICATIONS

Machine translation JP 2014-152319 (Year: 2014).*
(Continued)

*Primary Examiner* — Alexandre F Ferre
(74) *Attorney, Agent, or Firm* — Westerman, Hattori, Daniels & Adrian, LLP

(57) ABSTRACT

A pressure-sensitive adhesive composition is disclosed making it possible that even when a polarizing film and a transparent conductive layer are laminated over each other to interpose a pressure-sensitive adhesive layer therebetween, this pressure-sensitive adhesive layer is formed as a pressure-sensitive adhesive layer capable of restraining the transparent conductive layer from being corroded, and further restraining a rise in the surface resistance of the transparent conductive layer, and a deterioration in the external appearance of this layer. Also disclosed are a pressure-
(Continued)

sensitive adhesive layer made from the pressure-sensitive adhesive composition, a pressure-sensitive-adhesive-layer-attached polarizing film, and an image display device using the pressure-sensitive-adhesive-layer-attached polarizing film. The pressure-sensitive adhesive composition includes a (meth)acryl-based polymer (A) and a conductive agent (B) having a molecular weight of 380 or more.

5 Claims, 2 Drawing Sheets

(51) Int. Cl.
    *B32B 7/02*     (2019.01)
    *B32B 15/02*     (2006.01)
    *B32B 27/30*     (2006.01)
    *G02B 5/30*     (2006.01)
    *C09J 7/38*     (2018.01)
    *C08F 220/18*     (2006.01)
    *C09J 133/08*     (2006.01)
    *C08K 5/42*     (2006.01)

(52) U.S. Cl.
    CPC ............. *C08F 220/18* (2013.01); *C09J 7/385* (2018.01); *C09J 11/06* (2013.01); *C09J 133/06* (2013.01); *C09J 133/08* (2013.01); *G02B 5/30* (2013.01); *G02B 5/305* (2013.01); *B32B 2307/202* (2013.01); *B32B 2307/412* (2013.01); *C08K 5/42* (2013.01); *C08K 2201/001* (2013.01); *C09J 2203/318* (2013.01); *C09J 2301/408* (2020.08)

(56) References Cited

FOREIGN PATENT DOCUMENTS

| | | | |
|---|---|---|---|
| JP | 2011-16908 A | | 1/2011 |
| JP | 2014-142462 A | | 8/2014 |
| JP | 2014-152319 A | | 8/2014 |
| JP | 2014-156535 A | | 8/2014 |
| JP | 2014-195988 A | | 10/2014 |
| JP | 2015-010191 A | | 1/2015 |
| JP | 2015-28138 A | | 2/2015 |
| JP | 2016-3285 A | | 1/2016 |
| KR | 20140132481 A | * | 11/2014 |
| KR | 10-2015-0002458 A | | 1/2015 |
| TW | 201432003 A | | 8/2014 |
| TW | 201435025 A | | 9/2014 |
| TW | 201504377 A | | 2/2015 |
| TW | 201606019 A | | 2/2016 |
| WO | 2010/018733 A1 | | 2/2010 |
| WO | 2014/125684 A1 | | 8/2014 |
| WO | 2014/208695 A1 | | 12/2014 |

OTHER PUBLICATIONS

Machine translation KR2014132481A (Year: 2014).*
Notification of Transmittal of Copies of Translation of the International Preliminary Report on Patentability (Form PCT/IB/338) issued in counterpart International Application No. PCT/JP2016/060236 dated Oct. 12, 2017, with Forms PCT/IB/373 and PCT/ISA/237 (11 pages).
International Search Report dated Jun. 28, 2016, issued in counterpart International Application No. PCT/JP2016/060236 (2 pages).
Office Action dated May 20, 2019, issued in counterpart CN Application No. 201680017604.4, with English machine translation. (17 pages).
Office Action dated May 16, 2019, issued in counterpart JP Application No. 2016-65389, with English translation. (14 pages).
Office Action dated May 20, 2019, issued in counterpart JP Application No. 2016-65389, with English translation. (14 pages).
Office Action dated Dec. 20, 2019, issued in counterpart TW application No. 105110091, with English translation. (12 pages).
Office Action dated Dec. 3, 2019, issued in counterpart JP application No. 2016-065389, with English translation. (10 pages).
Office Action dated Apr. 20, 2020, issued in counterpart CN Application No. 201680017604.4, with English translation (13 pages).
Office Action dated Jul. 3, 2020, issued in counterpart JP Application No. 2016-065389, with English Translation. (6 pages).
Office Action dated Oct. 14, 2020, issued in counterpart TW Application No. 105110091, with English Translation. (13 pages).
A reconsideration Report by Examiner before Appeal dated Nov. 4, 2020, issued in counterpart JP Application No. 2016-065389, with English Translation. (7 pages).
Office Action dated Feb. 16, 2021, issued in counterpart KR Application No. 10-2017-7026120, with English translation (13 pages).
Office Action dated Jan. 19, 2021, issued in counterpart CN Application No. 201680017604.4, with English translation (11 pages).
Office Action dated Feb. 18, 2021, issued in counterpart JP Application No. 2020-011331, with English translation (9 pages).
Office Action dated Jun. 9, 2021, issued in counterpart JP Application No. 2016-065389, with English Translation. (32 pages).

* cited by examiner

PRESSURE-SENSITIVE ADHESIVE COMPOSITION, PRESSURE-SENSITIVE ADHESIVE LAYER, PRESSURE-SENSITIVE ADHESIVE-LAYER—ATTACHED POLARIZING FILM, AND IMAGE DISPLAY DEVICE

TECHNICAL FIELD

The present invention relates to a pressure-sensitive adhesive composition for forming a pressure-sensitive adhesive layer which a polarizing film has, the pressure-sensitive-adhesive-layer-attached polarizing film being used in the state of being bonded to a transparent conductive layer. The invention also relates to a pressure-sensitive adhesive layer made from the pressure-sensitive adhesive composition. The invention also relates to a pressure-sensitive-adhesive-layer-attached polarizing film which has a polarizing film and the pressure-sensitive adhesive layer, and is usable in the state of being bonded to a transparent conductive layer. Furthermore, the invention relates to a liquid crystal display device, an organic EL display device, a PDP or any other image display device in which the pressure-sensitive-adhesive-layer-attached polarizing film is used.

BACKGROUND ART

Hitherto, in many cases, image display devices have each made use of a transparent conductive film, which is obtained by forming, onto a transparent resin film, a metal oxide layer made of, e.g., ITO (indium tin composite oxide) as, e.g., an electrode of a touch sensor. As an alternative for the transparent conductive film, which is obtained by the formation of the metal oxide layer, known is a transparent conductive film containing a metal mesh.

The transparent conductive film may be used in an image display device or the like. A polarizing film may be laminated over the transparent conductive film to interpose a pressure-sensitive adhesive layer between the two films.

As a pressure-sensitive adhesive composition used in image display devices, an acrylic pressure-sensitive adhesive agent is widely used, which contains a (meth)acryl-based polymer. Known is, for example, a pressure-sensitive adhesive layer of a pressure-sensitive-adhesive-layer-attached transparent conductive film, this pressure-sensitive adhesive layer including, as a monomer for its monomer units, an alkyl acrylate having an alkyl group having 2 to 14 carbon atoms (see, for example, Patent Document 1). Known is also a pressure-sensitive adhesive composition for optical films that includes a phosphoric acid ester compound, and a (meth)acryl-based polymer obtained by polymerizing monomer components including, as a main component thereof, an alkyl (meth)acrylate having an alkyl group having 4 to 18 carbon atoms (see, for example, Patent Document 2).

PRIOR ART DOCUMENTS

Patent Documents

Patent Document 1: JP-A-2011-016908
Patent Document 2: JP-A-2015-028138

SUMMARY OF THE INVENTION

Problems to be Solved by the Invention

The pressure-sensitive adhesive layer in Patent Document 1 is a layer laid on a transparent plastic substrate surface having no transparent conductive layer, so that the pressure-sensitive adhesive layer and the transparent conductive layer do not contact each other. Thus, no investigations are made about corrosion of the transparent conductive layer that is based on the pressure-sensitive adhesive layer. In Patent Document 2, a corrosion of a transparent conductive layer is investigated; however, the invention according to this document is an invention of adding a phosphoric acid ester compound to a pressure-sensitive adhesive layer to restrain the corrosion. Thus, the document never describes any specified conductive agent.

When a polarizing film and a transparent conductive layer are laminated over each other to interpose, therebetween, a pressure-sensitive adhesive layer to which an antistatic function is given, the transparent conductive layer may be corroded from an edge of this layer. Such a corrosion phenomenon becomes remarkable when the transparent conductive layer is a transparent conductive layer containing a metal mesh. Furthermore, the phenomenon becomes especially remarkable when the laminate is put in a humidified environment. The inventors have newly found out that the transparent conductive layer is corroded by water and a conductive agent for giving an antistatic function to the pressure-sensitive adhesive layer.

This would be based on the matter that in accordance with the species of the conductive agent added to the pressure-sensitive adhesive layer to give an antistatic function to this layer, the pressure-sensitive adhesive layer becomes high in water absorption percentage so that water contained in the pressure-sensitive adhesive layer causes the corrosion of the transparent conductive layer to advance. The inventors have newly found out that in accordance with the species of the conductive agent, the conductive agent may be unevenly distributed near the interface between the pressure-sensitive adhesive layer and the transparent conductive layer, and the conductive agent distributed unevenly near the interface accelerates the advance of the corrosion based on the conductive agent.

Accordingly, an object of the present invention is to provide a pressure-sensitive adhesive composition making it possible that even when a polarizing film and a transparent conductive layer are laminated over each other to interpose a pressure-sensitive adhesive layer therebetween, this pressure-sensitive adhesive layer is famed as a pressure-sensitive adhesive layer capable of restraining the transparent conductive layer from being corroded, and further restraining a rise in the surface resistance of the transparent conductive layer, and a deterioration in the external appearance of this layer. Such a phenomenon becomes remarkable when the transparent conductive layer is a transparent conductive layer containing a metal mesh. Thus, another object thereof is to provide a pressure-sensitive adhesive composition making it possible that even when the transparent conductive layer is a conductive layer containing a metal mesh, a pressure-sensitive adhesive layer is famed which is capable of restraining the metal-mesh-containing conductive layer from being corroded, and further restraining a rise in the surface resistance of the metal-mesh-containing conductive layer, and a deterioration in the external appearance of the layer. An additional object of the invention is to provide a pressure-sensitive adhesive layer made from the pressure-sensitive adhesive composition, a pressure-sensitive-adhesive-layer-attached polarizing film, and an image display device using the pressure-sensitive-adhesive-layer-attached polarizing film.

Means for Solving the Problems

In order to solve the problems, the present inventors have repeatedly made eager investigations to find out a pressuresensitive-adhesive composition described below. Thus, the present invention has been achieved.

The present invention relates to a pressure-sensitive adhesive composition for forming a pressure-sensitive adhesive layer, the layer being a pressure-sensitive adhesive layer of a pressure-sensitive-adhesive-layer-attached polarizing film used in the state of being bonded to a transparent conductive layer, the composition including a (meth)acryl-based polymer (A) and a conductive agent (B) having a molecular weight of 380 or more.

The conductive agent (B) is preferably an ionic compound having an anionic component and a cationic component, and the total number of carbon atoms in the anionic component is 6 or more.

The total number of carbon atoms in the cationic component of the conductive agent (B) is preferably 6 or more.

The (meth)acryl-based polymer (A) preferably includes, as monomers for its monomer units, one or more monomers selected from the group consisting of carboxyl-group-containing monomers, hydroxyl-group-containing monomers and amide-group-containing monomers, and an alkyl (meth) acrylate.

The conductive agent (B) preferably has a molecular weight of 600 or more.

The invention show a remarkable effect when the transparent conductive layer is a transparent conductive layer including a metal mesh.

The present invention also relates to a pressure-sensitive adhesive layer made from the pressure-sensitive adhesive composition.

The present invention also relates to a pressure-sensitive-adhesive-layer-attached polarizing film, which includes a polarizing film, and the pressure-sensitive adhesive layer, and is usable in the state of being bonded to a transparent conductive layer.

The present invention further relates to an image display device, including the pressure-sensitive-adhesive-layer-attached polarizing film, and a transparent conductive layer, wherein the pressure-sensitive-adhesive-layer-attached polarizing film is bonded to the transparent conductive layer.

Effect of the Invention

The pressure-sensitive adhesive composition of the present invention includes the conductive agent (B), the molecular weight of which is 380 or more. Thus, in the case of laminating a polarizing film and a transparent conductive layer onto each other to interpose, therebetween, a pressure-sensitive adhesive layer made from the pressure-sensitive adhesive composition, the corrosion of the transparent conductive layer can be restrained, and further a rise in the surface resistance of the transparent conductive layer and a deterioration in the external appearance of the layer can be restrained. Moreover, this advantageous effect is remarkable when the transparent conductive layer is a transparent conductive layer containing a metal mesh. This would be based on the following: in the present invention, the use of the conductive agent (B), which is large in molecular weight, can make the pressure-sensitive adhesive layer low in water absorption percentage even in a humidified environment; in addition, the large-molecular-weight conductive agent (B) is not easily shifted in a humidified environment not to be unevenly distributed, with ease, near the interface between the pressure-sensitive adhesive layer and the transparent conductive layer. Thus, in the humidified environment also, the state is easily kept that the conductive agent is evenly dispersed in the pressure-sensitive adhesive layer; consequently, the corrosion of the transparent conductive layer can be restrained.

The pressure-sensitive-adhesive-layer-attached polarizing film of the present invention includes the pressure-sensitive adhesive layer; thus, even when this polarizing film is laminated onto a transparent conductive layer, the corrosion of the transparent conductive layer can be restrained. Moreover, even when the transparent conductive layer is a transparent conductive layer containing a metal mesh, the corrosion of this metal-mesh-containing conductive layer can be restrained. Furthermore, in the image display device comprising the pressure-sensitive-adhesive-layer-attached polarizing film of the present invention, the corrosion of its transparent conductive layer is restrained, so that the display device is high in reliability.

MODE FOR CARRYING OUT THE INVENTION

1. Pressure-Sensitive Adhesive Composition

The pressure-sensitive adhesive composition of the present invention is a pressure-sensitive adhesive composition for forming a pressure-sensitive adhesive layer, this layer being a pressure-sensitive adhesive layer of a pressure-sensitive-adhesive-layer-attached polarizing film used in the state of being bonded to a transparent conductive layer. This composition includes a (meth)acryl-based polymer (A) and a conductive agent (B) having a molecular weight of 380 or more.

Figure 1:
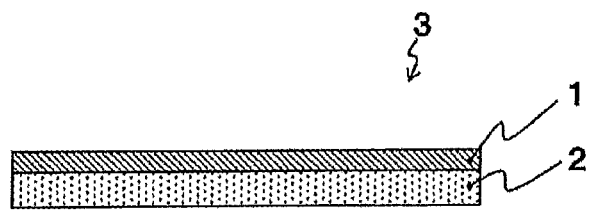
FIG. 1 is a sectional view that schematically illustrates one embodiment of the pressure-sensitive-adhesive-layer-attached polarizing film of the present invention.

About a pressure-sensitive adhesive layer made from the pressure-sensitive adhesive composition of the present invention, a description will be made, referring to the drawings. However, the invention is not limited to embodiments in the drawings. As illustrated in FIG. 1, a pressure-sensitive adhesive composition of the present invention is a pressure-sensitive adhesive composition for forming a pressure-sensitive adhesive layer 2, this layer 2 being a pressure-sensitive adhesive layer of a pressure-sensitive-adhesive-layer-attached polarizing film 3 in which a polarizing film 1 and the pressure-sensitive adhesive layer 2 are laminated onto each other. As illustrated in each of FIGS. 2 to 4, a pressure-sensitive-adhesive-layer-attached polarizing film 3 of the present invention is used in the state of being bonded to a transparent electroconductive layer 4. Hereinafter, the component-composition of the pressure-sensitive adhesive composition of the invention will be described.

(1) (Meth)Acryl-Based Polymer (A)

The pressure-sensitive adhesive composition of the present invention includes a (meth)acryl-based polymer (A). The (meth)acryl-based polymer (A) usually includes, as a component for its monomer units, an alkyl (meth)acrylate as a main component. The (meth)acrylate denotes an acrylate and/or a methacrylate. In the invention, the expression "(meth)" has the same meaning or a similar meaning.

The alkyl (meth)acrylate, from which a main skeleton of the (meth)acryl-based polymer (A) is made, is, for example, an alkyl (meth)acrylate having a linear or branched alkyl group having 1 to 18 carbon atoms. Examples of the alkyl group include methyl, ethyl, propyl, isopropyl, butyl, isobutyl, amyl, hexyl, cyclohexyl, heptyl, 2-ethylhexyl, isooctyl, nonyl, decyl, isodecyl, dodecyl, isomyristyl, lauryl, tridecyl, pentadecyl, hexadecyl, heptadecyl, and octadecyl groups. These groups may be used singly or in combination.

The alkyl (meth)acrylate is a main component of the whole of a monomer or monomers from which the (meth)acryl-based polymer (A) is made. The main component means that the proportion of the alkyl (meth)acrylate in the whole of the monomer(s), from which the (meth)acryl-based polymer (A) is made, is from about 70 to 100% by weight. The proportion is preferably from about 80 to 99.9% by weight, more preferably from about 90 to 99.9% by weight.

In the present invention, the (meth)acryl-based polymer (A) preferably includes, as one or more monomers for its monomer units, one or more monomers selected from the group consisting of carboxyl-group-containing monomers, hydroxyl-group-containing monomers, and amide-group-containing monomers from the viewpoint of restraining the corrosion of the transparent conductive layer, in particular, from the viewpoint of restraining the corrosion of the transparent conductive layer containing a metal mesh. About the carboxyl-group-containing monomers, the hydroxyl-group-containing monomers, and the amide-group-containing monomers, any one thereof may be used, or two or more thereof may be used in combination. From the viewpoint of the corrosion resistance of the transparent conductive layer, it is most preferred that the (meth)acryl-based polymer (A) includes an amide-group-containing monomer. It is second most preferred that the (meth)acryl-based polymer (A) includes a hydroxyl-group-containing monomer. It is third most preferred that the (meth)acryl-based polymer (A) includes a carboxyl-group-containing monomer.

As the carboxyl-group-containing monomer, without any especial limitation, a monomer is usable which has a polymerizable group having an unsaturated double bond, such as a (meth)acryloyl group or a vinyl group, and which has a carboxyl group. Examples of the carboxyl-group-containing monomer include (meth)acrylic acid, carboxyethyl (meth)acrylate, carboxypentyl (meth)acrylate, itaconic acid, maleic acid, fumaric acid, crotonic acid, and isocrotonic acid. These monomers may be used singly or in combination. About itaconic acid and maleic acid, acid anhydrides thereof may be used. Out of these monomers, acrylic acid and methacrylic acid are preferred, and acrylic acid is particularly preferred. In general, when a pressure-sensitive adhesive layer including a polymer including, as a monomer for its monomer units, a carboxyl-group-containing monomer is used as a layer including a metal, such as a transparent conductive layer, a corrosion of the metal layer may be caused by the carboxyl group. Accordingly, no carboxyl-group-containing monomer is usually used for a pressure-sensitive adhesive about which corrosion resistance is a purpose. In the present invention, the pressure-sensitive adhesive composition includes the carboxyl-group-containing monomer, together with the hydroxyl-group-containing monomer and/or amide-group-containing monomer, which will be detailed later, and this matter can improve the dispersibility of a conductive agent in the composition. In a pressure-sensitive adhesive layer made from the conductive-agent-dispersibility-improved pressure-sensitive adhesive composition, there is not caused any uneven distribution of the conductive agent. As a result, the pressure-sensitive adhesive layer favorably gains a higher transparent-conductive-layer-corrosion-restraining effect.

The proportion of the carboxyl-group-containing monomer is preferably 5% or less, more preferably from 0.1 to 3%, even more preferably from 0.1 to 1% by weight of the entire monomers from which the (meth)acryl-based polymer (A) is made. If the proportion of the carboxyl-group-containing monomer is more than 5% by weight, the transparent-conductive-layer-corrosion-restraining effect unfavorably decreases. In the present invention, the pressure-sensitive adhesive composition includes the conductive agent (B), the molecular weight of which is 380 or more, and this matter can restrain the corrosion of the transparent conductive layer (particularly, the transparent conductive layer including a metal mesh); and a higher corrosion-restraining effect can be gained by the matter that the (meth)acryl-based polymer (A) includes, as a monomer for its monomer units, the carboxyl-group-containing monomer in a very small amount that is about 5% or less by weight.

The hydroxyl-group-containing monomer is a compound containing, in the structure thereof, a hydroxyl group, and further containing therein a polymerizable unsaturated double bond of, for example, a (meth)acryloyl group or vinyl group. Specific examples of the hydroxyl-group-containing monomer include hydroxyalkyl (meth)acrylates such as 2-hydroxyethyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, and 12-hydroxylauryl (meth)acrylate; and (4-hydroxymethylcyclohexyl)-methyl acrylate. Out of these hydroxyl-group-containing monomers, preferred are 2-hydroxyethyl (meth)acrylate, and 4-hydroxybutyl (meth)acrylate, and particularly preferred is 4-hydroxybutyl (meth)acrylate from the viewpoint of the endurance of the resultant pressure-sensitive-adhesive layer.

The proportion of the hydroxyl-group-containing monomer is preferably from 0.01 to 15%, more preferably from 0.03 to 10%, even more preferably from 0.05 to 7% by weight of the entire monomers from which the (meth)acryl-based polymer (A) is made.

The amide-group-containing monomer is a compound containing, in the structure thereof, an amide group, and further containing therein a polymerizable unsaturated double bond of, for example, a (meth)acryloyl group or vinyl group. Specific examples of the amide-group-containing monomer include (meth)acrylamide based monomers such as (meth)acrylamide, N,N-dimethyl(meth)acrylamide, N,N-diethyl(meth)acrylamide, N-isopropyl acrylamide, N-methyl(meth)acrylamide, N-butyl(meth)acrylamide, N-hexyl(meth)acrylamide, N-methylol(meth)acrylamide, N-methylol-N-propane(meth)acrylamide, aminomethyl (meth)acrylamide, aminoethyl(meth)acrylamide, mercaptomethyl(meth)acrylamide, and mercaptoethyl(meth)acrylamide; N-acryloyl heterocyclic monomers such as N-(meth)acryloylmorpholine, N-(meth)acryloylpiperidine, and N-(meth)acryloylpyrrolidine; and N-vinyl-group-containing lactam monomers such as N-vinylpyrrolidone and N-vinyl-ε-caprolactam. Out of such amide-group-containing monomers, N-vinyl-group-containing lactam monomer is preferred.

The proportion of the amide-group-containing monomer is preferably 10% or less, more preferably from 0.01 to 10%, even more preferably from 0.03 to 7%, in particular preferably from 0.05 to 5% by weight of the entire monomers from which the (meth)acryl-based polymer (A) is made. In the present invention, the pressure-sensitive adhesive composition includes the conductive agent (B), the molecular weight of which is 380 or more, and this matter can restrain the corrosion of the transparent conductive layer; and a higher corrosion-restraining effect can be favorably gained in the same way as in the case of the addition of the hydroxyl-group-containing monomer or the carboxyl-group-containing monomer by the matter that the (meth) acryl-based polymer (A) includes, as a monomer for its monomer units, the amide-group-containing monomer in an amount of 10% or less by weight.

As far as the advantageous effects of the present invention are not damaged, a copolymerizable monomer can be introduced into the (meth)acryl-based polymer (A), the monomer being other than the alkyl (meth)acrylate, the carboxyl-group-containing monomer, the amide-group-containing monomer and the hydroxyl-group-containing monomer. The blend proportion thereof is not particularly limited, and is preferably about 10% or less by weight of the entire monomers from which the (meth)acryl-based polymer (A) is made.

The (meth)acryl-based polymer (A) in the present invention is usually a polymer having a weight-average molecular weight of 500,000 to 3,000,000. Considering the endurance of the pressure-sensitive adhesive composition, particularly, the heat resistance thereof, the weight-average molecular weight is preferably from 700,000 to 2700,000, more preferably from 800,000 to 250,0000. If the weight-average molecular weight is less than 500,000, the pressure-sensitive adhesive composition is unfavorable from the viewpoint of the heat resistance. If the weight-average molecular weight is more than 3,000,000, a large amount of a diluting agent is necessary for adjusting the composition into a viscosity permitting the composition to be applied, so that costs unfavorably increase. The weight-average molecular weight denotes a value obtained by measuring the (meth)acryl-based polymer (A) by GPC (gel permeation chromatography), and calculating out a value from the resultant value in terms of the molecular weight of polystyrene.

Such a (meth)acryl-based polymer (A) may be produced by a method selected appropriately from known production methods such as solution polymerization, bulk polymerization, emulsion polymerization and various radical polymerizations. The resultant (meth)acryl-based polymer (A) may be any one of a random copolymer, a block copolymer, a graft copolymer and other polymers.

In the solution polymerization, as a polymerization solvent, for example, ethyl acetate or toluene is used. In a specific example of the solution polymerization, reaction is performed in the presence of an added polymerization initiator in an inert gas, such as nitrogen, ordinarily under reaction conditions of a temperature of about 50 to 70° C. and a period of about 5 to 30 hours.

A polymerization initiator, a chain transfer agent, an emulsifier and others that are used in the radical polymerizations are not particularly limited, and may be appropriately selected to be used. The weight-average molecular weight of the (meth)acryl-based polymer is controllable in accordance with the respective use amounts of the polymerization initiator and the chain transfer agent, and the reaction conditions. In accordance with the species of these agents, the use amounts thereof are appropriately adjusted.

Examples of the polymerization initiator include azo initiators such as 2,2'-azobisisobutyronitrile, 2,2'-azobis(2-amidinopropane) dihydrochloride, 2,2'-azobis[2-(5-methyl-2-imidazoline-2-yl)propane] dihydrochloride, 2,2'-azobis(2-methylpropionamidine) disulfate, 2,2'-azobis(N,N'-dimethyleneisobutylamidine), and 2,2'-azobis[N-(2-carboxyethyl)-2-methylpropionamidine] hydrate (trade name: VA-057, manufactured by Wako Pure Chemical Industries, Ltd.); persulfates such as potassium persulfate, and ammonium persulfate; peroxide initiators such as di(2-ethylhexyl) peroxydicarbonate, di(4-t-butylcyclohexyl) peroxydicarbonate, di-sec-butyl peroxydicarbonate, t-butyl peroxyneodecanoate, t-hexyl peroxypivalate, t-butylperoxypivalate, dilauroyl peroxide, di-n-octanoyl peroxide, 1,1,3,3-tetramethylbutyl peroxy-2-ethylhexanoate, di(4-methylbenzoyl) peroxide, dibenzoyl peroxide, t-butyl peroxyisobutyrate, 1,1-di(t-hexylperoxy) cyclohexane, t-butyl hydroperoxide, and hydrogen peroxide; redox initiators, which are each a combination of a peroxide with a reducing agent, such as a combination of a persulfate with sodium hydrogensulfite, and a combination of a peroxide with sodium ascorbate. However, the polymerization initiator is not limited to these examples.

Such polymerization initiators may be used singly or in the form of a mixture of two or more thereof. The content of the whole of the initiator(s) is preferably from about 0.005 to 1 part by weight, more preferably from about 0.02 to 0.5 part by weight for 100 parts by weight of the entire monomer component(s) constituting the (meth)acryl-based polymer (A).

In order to use, for example, 2,2'-azoisobutyronitrile as the polymerization initiator to produce a (meth)acryl-based polymer having a weight-average molecular weight in the above-mentioned range, the use amount of the polymerization initiator(s) is preferably from about 0.06 to 0.2 part by weight, more preferably from about 0.08 to 0.175 parts by weight for 100 parts by weight of the entire monomer component(s).

The chain transfer agent, the emulsifier or the polymerizable emulsifier when used in emulsion polymerization, and other components may be used appropriately selected from conventionally known agents and components.

(2) Conductive Agent (B)

The pressure-sensitive adhesive composition of the present invention includes the conductive agent (B), the molecular weight of which is 380 or more, to make it possible to restrain any corrosion of the transparent conductive layer (particularly, the transparent conductive layer containing a metal mesh). It is therefore possible to restrain a rise in the surface resistance of the transparent conductive layer, and a deterioration in the external appearance thereof. The molecular weight of the conductive agent (B) is 380 or more, more preferably 400 or more, even more preferably 500 or more, in particular preferably 600 or more. As the molecular weight of the conductive agent (B) is larger, the pressure-sensitive-adhesive layer including the conductive agent (B) is larger in water absorption percentage and further the uneven distribution of the conductive agent (B) is less caused in the interface between the pressure-sensitive-adhesive layer and the transparent conductive layer. It is therefore possible to restrain the corrosion of the transparent conductive layer (particularly, the transparent conductive layer containing a metal mesh). The upper limit of the molecular weight of the conductive agent (B) is not particularly limited, and is preferably 2,000 or less to keep the antistatic function of the pressure-sensitive-adhesive layer surely.

If the molecular weight of the conductive agent (B) is less than 380, the water absorption percentage of the pressure-sensitive-adhesive layer becomes high. Thus, the corrosion of the transparent conductive layer would be advanced by water contained in the pressure-sensitive-adhesive layer. If the molecular weight of the conductive agent (B) is less than 380, the small molecular weight causes the conductive agent to be easily shifted, in the pressure-sensitive-adhesive layer, near the interface between this layer and the transparent conductive layer, so that the conductive agent (B) is unevenly distributed. Consequently, the transparent conductive layer would be corroded by the conductive agent near the interface. It is considered that in the pressure-sensitive-adhesive layer, the conductive agent tends to be unevenly distributed in a large proportion near the interface between the layer and the transparent conductive layer so that the advance of the corrosion is accelerated by the conductive agent near the interface. Such a phenomenon is particularly remarkable in the transparent conductive layer including a metal mesh. Moreover, the phenomenon is particularly remarkable in a humidified environment also. It is considered that: in the present invention, the conductive agent (B), the molecular weight of which is 380 or more, is used; the large molecular weight causes the conductive agent not to be easily shifted in the pressure-sensitive-adhesive layer in a humidified environment also, so that the conductive agent is not unevenly distributed with ease; thus, the pressure-sensitive-adhesive layer easily keeps a conductive-agent-evenly-dispersed state to make it possible to restrain the corrosion of the transparent conductive layer (particularly, the transparent conductive layer containing a metal mesh).

The conductive agent (B) is preferably an ionic compound having an anionic component and a cationic component. The anionic component and the cationic component will be described.

(Anionic Component of Ionic Compound)

In the present invention, the total number of carbon atoms in the anionic component is preferably 6 or more, more preferably 8 or more. The upper limit of the total number of the carbon atoms in the anionic component is not particularly limited, is preferably 16 or less, more preferably 10 or less. When the total number of the carbon atoms in the anionic component is 6 or more, the conductive agent (B) itself becomes high in hydrophobicity. Thus, the pressure-sensitive-adhesive layer easily does not contain water, so that the corrosion of the transparent conductive layer can be favorably restrained.

The anionic component preferably has an organic group. The organic group is preferably an organic group having 3 or more carbon atoms, more preferably an organic group having 4 or more carbon atoms.

The molecular weight of the anionic component is not particularly limited. It is sufficient for the molecular weight to render the molecular weight of the conductive agent (B) a value of 380 or more. The molecular weight of the anionic component is preferably 100 or more, more preferably 200 or more, even more preferably 300 or more. When the molecular weight of the anionic component is in any one of these ranges, the conductive agent (B) itself becomes high in hydrophobicity. Thus, the pressure-sensitive-adhesive layer easily does not contain water, so that the corrosion of the transparent conductive layer (particularly, the transparent conductive layer containing a metal mesh) can be favorably restrained. The upper limit of the molecular weight of the anionic component is not particularly limited, and is preferably 1,000 or less to keep the antistatic function of the pressure-sensitive-adhesive layer surely.

From the viewpoint of the corrosion, the anionic component is preferably at least one of anionic components represented by the following general formula (1):

$$(C_nF_{2n+1}SO_2)_2N— \tag{1}$$

wherein n is an integer of 1 to 10 (n is preferably an integer of 3 to 10); the following general formula (2):

$$CF_2C_mF_{2m}SO_2)_2N— \tag{2}$$

wherein m is an integer of 1 to 10 (m is preferably an integer of 2 to 10); and the following general formula (3):

$$—O_3S(CF_2)_lSO_3— \tag{3}$$

wherein l is an integer of 1 to 10 (l is preferably an integer of 3 to 10).

Specific examples of the anionic component represented by the general formula (1) include a bis(trifluoromethanesulfonyl)imide anion, a bis(heptafluoropropanesulfonyl)imide anion, a bis(nonafluorobutanesulfonyl)imide anion, a bis(undecafluoropentanesulfonyl)imide anion, a bis(tridacafluorohexanesulfonyl)imide anion, and a bis(pentadecafluoroheptanesulfonyl)imide anion. Out of these anions, preferred are a bis(trifluoromethanesulfonyl)imide anion and a bis(nonafluorobutanesulfonyl)imide anion. Particularly preferred is a bis(nonafluorobutanesulfonyl)imide anion.

A specific example of the anionic component represented by the general formula (2) is a cyclo-hexafluoropropane-1,3-bis(sulfonyl)imide anion. This anion is preferably usable.

A specific example of the anionic component represented by the general formula (3) is a hexafluoropropane-1,3-disulfonic acid anion. This anion is preferably usable.

(Cationic Component of Ionic Component)

The cationic component of the ionic compound is preferably an organic cation. The total number of carbon atoms in the cation is preferably 6 or more, more preferably 8 or more, even more preferably 10 or more. The upper limit of the total number of the carbon atoms in the cation is not particularly limited, and is preferably 40 or less, more preferably 30 or less. When the total number of the carbon atoms in the cation is 6 or more, the conductive agent (B) itself becomes high in hydrophobicity so that the pressure-sensitive adhesive layer does not easily contain water. Consequently, the corrosion of the transparent conductive layer (particularly, the transparent conductive layer containing a metal mesh) can be favorably restrained.

The cationic component preferably has an organic group. The organic group is preferably an organic group having 3 or more carbon atoms, more preferably an organic group having 7 or more carbon atoms.

In the present invention, the use of the organic cation is preferred. However, as far as the molecular weight of the conductive agent (B) is 380 or more, the cationic component may be, for example, an ion of an alkali metal such as lithium, sodium or potassium.

When the cationic component of the ionic compound is an organic cation, the cationic component is combined with the above-mentioned anionic component to constitute an organic cation-anion salt as the ionic compound. The organic cation-anion salt may also be called ionic liquid or ionic solid. A specific example of the organic cation is a pyridinium cation, piperidinium cation, pyrrolidinium cation, cation having a pyrroline skeleton, cation having a pyrrole skeleton, imidazolinium cation, tetrahydropyridinium cation, dihydropyridinium cation, pyrazolium cation, pyrazolinium cation, tetraalkylammonium cation, trialkylsulfonium cation, or tetraalkylphosphonium cation.

Specific examples of the organic cation-anion salt, which are appropriately selected from compounds each made of a combination of a cationic component as described above with an anionic component, include butylmethylimidazolium bis(nonafluorobutanesulfonyl)imide, N-butyl-methylpyridium bis(nonafluorobutanesulfonyl)imide, methylpropylpyrrolidinium bis(nonafluorobutanesulfonyl)imide, 1-butyl-3-methylpyridinium bis(heptafluoropropanesulfonyl)imide, 1-butyl-3-methylpyridinium bis(nonafluorobutanesulfonyl)imide, 1-butyl-3-methylpyridinium hexafluorocyclopropane-1,3-bis(sulfonyl)imide, bis(1-butyl-3-methylpyridium) hexafluoropropane-1,3-disulfonic acid, 1-ethyl-3-methylimidazolium bis(heptafluoropropanesulfonyl)imideimide, 1-ethyl-3-methylimidazolium bis(nonafluorobutanesulfonyl)imide, 1-ethyl-3-methylimidazolium hexafluorocyclopropane-1,3-bis(sulfonyl)imide, bis(1-ethyl-3-methylpyridinium)hexafluoropropane-1,3-disulfonic acid, methyltrioctylammonium bis(trifluoromethanesulfonyl)imide, methyltrioctylammonium bis(nonafluorobutanesulfonyl)imide, hexylmethylpyridinium bis(trifluoromethanesulfonyl)imide, ethylmethylpyrrolidium bis(trifluoromethanesulfony)imide, methylpropylpyrrolidium bis(trifluoromethanesulfony)imide, butylmethylpyperidium bis(trifluromethanesulfonyl)imide, methyltrioctylammonium bis(fluorosulfonyl)imide, and 1-decylpyridium bis(trifluoromethanesulfonyl)imide.

Specific examples of the alkali metal salt include bis(heptafluoropropanesulfonyl)imide lithium, bis(heptafluoropropanesulfonyl)imide sodium, bis(heptafluoropropanesulfonyl)imide potassium, bis(nonafluorobutanesulfonyl)imide lithium, bis(nonafluorobutanesulfonyl)imide sodium, and bis(nonafluorobutanesulfonyl)imide potassium.

The proportion of the conductive agent (B) in the pressure-sensitive adhesive composition of the present invention is preferably from 0.001 to 10 parts by weight, more preferably from 0.1 to 5 parts by weight, even more preferably from 0.3 to 3 parts by weight for 100 parts by weight of the (meth)acryl-based polymer (A). If the amount of the conductive agent (B) is less than 0.001 parts by weight, the resultant pressure-sensitive adhesive layer may not produce the corrosion-restraining effect. If the amount of the conductive agent (B) is more than 10 parts by weight, the adhesive layer may not be sufficient in endurance.

(3) Crosslinking Agent (C)

The pressure-sensitive adhesive composition of the present invention may include, besides the above-mentioned components, a crosslinking agent (C). The crosslinking agent (C) may be an organic crosslinking agent, or a polyfunctional metal chelate. Examples of the organic crosslinking agent include isocyanate based, peroxide based, epoxy based, and imine based crosslinking agents. The polyfunctional metal chelate is a compound in which a polyvalent metal is covalently bonded or coordinate-bonded to an organic compound. Examples of the atom of the polyvalent metal include Al, Cr, Zr, Co, Cu, Fe, Ni, V, Zn, In, Ca, Mg, Mn, Y, Ce, Sr, Ba, Mo, La, Sn, and Ti. An atom in the organic compound to which the metal is covalently bonded or coordinate-bonded is, for example, an oxygen atom. Examples of the organic compound include alkyl esters, alcohol compounds, carboxylic acid compounds, ether compounds, and ketone compounds.

The use amount of the crosslinking agent (C) is preferably from 0.01 to 20 parts by weight, more preferably from 0.03 to 10 parts by weight for 100 parts by weight of the (meth)acryl-based polymer (A).

(4) Others

The pressure-sensitive adhesive composition of the present invention may further include known additives. For example, the following may be appropriately added to the composition in accordance with an article in which the composition is used: various type of the silane coupling agent, polyether compounds of a polyalkylene glycol such as polypropylene glycol; powder of a colorant or a pigment; dyes; surfactants; plasticizers; tackifiers; surface lubricants; leveling agents; softeners; antioxidants; antiaging agents; light stabilizers; ultraviolet absorbents; polymerization inhibitors; inorganic or organic fillers; metal powder; and granular or foil-piece-form substances. A redox system, to which a reducing agent is added, may be used as far as the system is controllable. These additives are used in an amount that is preferably 5 parts by weight or less, more preferably 3 parts by weight or less, even more preferably 1 part by weight or less for 100 parts by weight of the (meth)acryl-based polymer.

2. Pressure-Sensitive-Adhesive Layer

The pressure-sensitive-adhesive layer of the present invention is formed from the above-mentioned pressure-sensitive-adhesive composition.

The method for forming the pressure-sensitive adhesive layer is, for example, a method of applying the pressure-sensitive adhesive composition onto, for example, a separator subjected to release treatment, and dry-removing the polymerization solvent and others to form the pressure-sensitive adhesive layer. The pressure-sensitive adhesive layer may be formed by, for example, a method of applying the pressure-sensitive adhesive composition onto a polarizing film, which will be detailed later, and dry-removing the polymerization solvent and others to form the pressure-sensitive adhesive layer onto the polarizing film. In the application of the pressure-sensitive adhesive composition, one or more solvents other than the polymerization solvent may be newly added to the pressure-sensitive-adhesive-layer-producing system.

The separator subjected to release treatment is preferably a silicone release liner. When the pressure-sensitive adhesive composition of the present invention is applied onto such a liner, and then dried to form the pressure-sensitive adhesive layer, the method for drying the pressure-sensitive adhesive may be a proper method adopted appropriately in accordance with the purpose. The method is preferably a method of heating the applied film to be dried. The heating and drying temperature is preferably from 40 to 200° C., more preferably from 50 to 180° C., in particular preferably from 70 to 170° C. When the heating temperature is set into any one of the ranges, the pressure-sensitive adhesive can be gained with excellent adhesive properties.

The drying period may be a proper period appropriately adopted. The drying period is preferably from 5 seconds to 20 minutes, more preferably from 5 seconds to 10 minutes, in particular preferably from 10 seconds to 5 minutes.

As the method for applying the pressure-sensitive-adhesive composition, various methods may be used. Specific examples thereof are extrusion coating methods such as roll coating, kiss roll coating, gravure coating, reverse coating, roll brush coating, spray coating, dip roll coating, bar coating, knife coating, air knife coating, curtain coating, lip coating, or die coater.

The thickness of the pressure-sensitive adhesive layer is not particularly limited, and is, for example, from about 1 to 100 μm, and is preferably from 2 to 50 μm, more preferably from 2 to 40 μm, even more preferably from 5 to 35 μm.

3. Pressure-Sensitive-Adhesive-Layer-Attached Polarizing Film

The pressure-sensitive-adhesive-layer-attached polarizing film of the present invention has a polarizing film and the above-defined pressure-sensitive-adhesive layer, and the pressure-sensitive-adhesive-layer-attached polarizing film is used in the state of being bonded to a transparent conductive layer.

The method for forming the pressure-sensitive-adhesive layer is as described above.

When the pressure-sensitive adhesive layer is formed onto, for example, a separator subjected to release treatment, the pressure-sensitive-adhesive-layer-attached polarizing film of the present invention can be famed by transferring the pressure-sensitive adhesive layer on the separator onto a transparent protective film surface of a polarizing film. The pressure-sensitive-adhesive-layer-attached polarizing film can also be formed by applying the pressure-sensitive adhesive composition onto a polarizing film, and then dry-removing the polymerization solvent and others.

An anchor layer may be formed onto a surface of the polarizing film to which the pressure-sensitive adhesive layer is to be applied, or the pressure-sensitive adhesive layer may be famed onto the same surface after the workpiece is subjected to easy adhesion treatment that may be of various types, such as corona treatment or plasma treatment. The outer surface of the pressure-sensitive adhesive layer may be subjected to easy adhesion treatment.

When the pressure-sensitive adhesive layer of the pressure-sensitive-adhesive-layer-attached polarizing film is exposed, the pressure-sensitive adhesive layer may be protected by a sheet subjected to release treatment (separator) until the pressure-sensitive-adhesive-layer-attached polarizing film is bonded onto a transparent conductive layer.

Examples of a constituent of the above-mentioned separator include resin films such as polyethylene, polypropylene, polyethylene terephthalate and polyester films, porous matters such as paper, fabric and nonwoven fabric pieces, nets, foamed sheets, metal foil pieces, laminates each made of two or more of these examples, and other appropriate thin pieces. The plastic film is preferably used since the film is excellent in surface smoothness.

Examples of the plastic film include polyethylene film, polypropylene film, polybutene film, polybutadiene film, polymethylpentene film, polyvinyl chloride film, vinyl chloride copolymer film, polyethylene terephthalate film, polybutylene terephthalate film, polyurethane film, and ethylene-vinyl acetate copolymer film.

The thickness of the separator is usually from 5 to 200 μm, preferably from about 5 to 100 μm. The separator may be optionally subjected to releasing treatment and antifouling treatment with, for example, a silicone based, fluorine-containing based, long-chain-alkyl based or aliphatic acid amide based release agent, or silica powder, and/or antistatic treatment in, for example, a painting, kneading-in or vapor deposition manner. By subjecting the surface(s) of the separator appropriately to, particularly, peeling treatment, such as silicone treatment, long-chain alkyl treatment or fluorine treatment, this film can be made higher in peeling property from the pressure-sensitive-adhesive layer.

The sheet subjected to release treatment, which is used in the production of the pressure-sensitive-adhesive-layer-attached polarizing film, may be used, as it is, as a separator for the pressure-sensitive-adhesive-layer-attached polarizing film. Thus, the process for the production can be made simple.

The polarizing film used is a polarizing film having a transparent protective film at least on one surface of a polarizer.

The polarizer is not particularly limited, and may be a polarizer that may be of various types. The polarizer may be, for example, a polarizer yielded by causing a dichroic substance, such as iodine or a dichroic dye, to be adsorbed into a hydrophilic polymeric film, such as a polyvinyl alcohol based film, a polyvinyl alcohol based film converted partially to formal or a partially saponified ethylene/vinyl acetate copolymer based film, and then stretching the resultant uniaxially; or a polyene based oriented film of, for example, a polyvinyl-alcohol-dehydrated product or a polyvinyl chloride de-hydrochloride-treated product. Out of such examples, preferred is a polarizer composed of a polyvinyl alcohol based film and a dichroic substance such as iodine. More preferred is an iodine-containing polarizer containing iodine and/or an iodine ion. The thickness of these polarizers is not particularly limited, and is generally from about 5 to 80 μm.

The polarizer yielded by dyeing a polyvinyl alcohol based film with iodine, and then stretching the resultant uniaxially may be produced, for example, by immersing a polyvinyl alcohol into an aqueous solution of iodine to dye the polyvinyl alcohol, and then stretching the resultant into a length 3 to 7 times the original length. The polyvinyl alcohol may be immersed into, for example, an aqueous solution of potassium iodine that may optionally contain, for example, boric acid, zinc sulfate or zinc chloride. Furthermore, before the dyeing, the polyvinyl alcohol film may be optionally immersed into water to be cleaned therewith. The cleaning of the polyvinyl alcohol based film with water makes it possible to clean away stains and an anti-blocking agent on the outer surface(s) of the polyvinyl alcohol based film. Furthermore, the polyvinyl alcohol based film is swollen to produce an advantageous effect of preventing dyeing-unevenness or some other unevenness. After or while dyed with iodine, the film may be stretched. Alternatively, after stretched, the film may be dyed with iodine. The stretching may be performed in an aqueous solution of, for example, boric acid or potassium iodide, or in a water bath.

In the present invention, a thin polarizer of 10 μm or less in thickness may be used. From the viewpoint of making the pressure-sensitive-adhesive-layer-attached polarizing film thinner, the thickness is preferably from 1 to 7 μm. Such a thin polarizer is preferred since the polarizer is small in thickness unevenness, is excellent in visibility, and is small in dimension change to be excellent in endurance, and can further make the resultant polarizing film also small in thickness.

Typical examples of the thin polarizer include thin polarizing membranes described in JP-A-S51-069644, JP-A-2000-338329, WO 2010/100917 pamphlet, WO 2010/100917 pamphlet, Japanese Patent No. 4751481, or JP-A-2012-073563. These thin polarizing membranes can each be obtained by a producing method including the step of stretching a polyvinyl alcohol based resin (hereinafter referred to also as a PVA based resin) layer and a resin substrate for stretching in a laminated state, and the step of dyeing the workpiece. Even when the PVA based resin layer is thin, this producing method makes it possible to stretch the layer without undergoing any inconvenience based on the stretching, such as breaking, by the matter that the layer is supported on the resin substrate for stretching.

The thin polarizing membrane is preferably a membrane obtained by the following producing method, out of producing methods including the step of stretching the laminated-state members and the step of dyeing the resultant, since the laminate can be stretched into a high stretch ratio to improve the resultant in polarizing performance: a method including the step of stretching the members in an aqueous solution of boric acid, as described in WO 2010/100917 pamphlet, WO 2010/100917 pamphlet, Japanese Patent No. 4751481, or JP-A-2012-073563. Particularly preferred is a thin polarizing membrane yielded by the producing method including the step of stretching the members auxiliary in the air before the stretching in the aqueous solution of boric acid, as described in Japanese Patent No. 4751481, or JP-A-2012-073563.

The material for forming the transparent protective film may be, for example, a thermoplastic resin excellent in transparency, mechanical strength, thermal stability, water blocking performance, isotropy, and others. Specific examples of such a thermoplastic resin include cellulose resins such as triacetylcellulose, polyester resins, polyethersulfone resins, polysulfone resins, polycarbonate resins, polyamide resins, polyimide resins, polyolefin resins, (meth) acrylic resins, cyclic polyolefin resins (norbornene based resins), polyarylate resins, polystyrene resins and polyvinyl alcohol resins; and any mixture of two or more thereof. The transparent protective film is bonded onto one of the two sides of the polarizer through an adhesive layer. As a transparent protective film on the other side, a thermosetting resin or ultraviolet-ray curing-type resin may be used, examples thereof including (meth)acrylic, urethane, acrylic urethane, epoxy and silicone based resins. Each of the transparent protective films may contain one or more arbitrarily-selected appropriate additives. Examples of the additives include ultraviolet absorbents, antioxidants, lubricants, plasticizers, release agents, anti-coloring agents, flame retardants, nucleating agents, antistatic agents, pigments, and colorants. The content of the thermoplastic resin in the transparent protective film is preferably from 50 to 100% by weight, more preferably from 50 to 99% by weight, even more preferably from 60 to 98% by weight, in particular preferably from 70 to 97% by weight. If the content of the thermoplastic resin in the transparent protective film is 50% by weight or less, it is feared that a high transparency and others that the thermoplastic resin originally has cannot be sufficiently expressed.

A transparent protective film is bonded onto at least one side of the polarizer through an adhesive layer. For the bonding treatment of the polarizer to the transparent protective film, an adhesive is used. Examples of the adhesive include isocyanate type, polyvinyl alcohol type, gelatin type, vinyl latex type, and aqueous polyester type adhesives. The adhesive is usually used in the form of an aqueous adhesive solution. The solution usually contains 0.5 to 60% by weight of solid. The adhesive for the polarizer and the transparent protective film may be, besides the above-mentioned adhesives, for example, an ultraviolet-ray curing-type adhesive or an electron-beam curing-type adhesive. Electron-beam curing-type adhesives for polarizing films show a suitable adhesion onto the above-mentioned various transparent protective films. A metal compound filler may be incorporated into the adhesive used in the present invention.

The pressure-sensitive-adhesive-layer-attached polarizing film of the present invention is used in the state of being bonded to a transparent conductive layer. The transparent conductive layer may be a metal mesh in which metal fine lines are made in the form of a lattice pattern, or a transparent conductive layer yielded by forming a metal oxide layer of, for example, ITO (indium tin composite oxide). The pressure-sensitive-adhesive-layer-attached polarizing film produces a remarkable corrosion resisting effect, particularly, for the metal mesh.

The metal which the metal mesh is made of may be any suitable metal as far as the metal is a metal high in electroconductivity. The metal, which the metal mesh is made of, is preferably at least one selected from the group consisting of gold, platinum, silver, aluminum, and copper. The metal is preferably aluminum, silver, copper or gold from the viewpoint of the electroconductivity thereof.

A transparent conductive layer containing the metal mesh may be formed by any appropriate method. The transparent conductive layer may be yielded, for example, by applying a photosensitive composition including a silver salt (transparent-conductive-layer-forming composition) onto an adherend such as a release film, and then subjecting the resultant to light exposure treatment and developing treatment to make fine lines of the metal into a predetermined pattern. The transparent conductive layer may also be yielded by printing a paste including metal fine particles (transparent-conductive-layer-forming composition) into a predetermined pattern. Details of such a transparent conductive layer and a method for forming the layer are described in, for example, JP-A-2012-18634. The description is incorporated into the present Description for reference. Another example of the transparent conductive layer, which is made of the metal mesh, and a method forming the layer is a transparent conductive layer and a method for forming the layer that are described in JP-A-2003-331654.

The thickness of the transparent conductive layer is preferably from about 0.01 to 10 μm, more preferably from about 0.05 to 3 μm, even more preferably from 0.1 to 1 μm.

The pressure-sensitive-adhesive-layer-attached polarizing film has, on its (metal-mesh-containing) transparent conductive layer, an overcoat (OC) layer (not illustrated).

As the overcoat layer, without any especial limitation, an overcoat layer used ordinarily in the present field is usable. The overcoat layer may be a layer made of, for example, an alkyd resin, acrylic resin, epoxy resin, urethane resin, or isocyanate resin. The thickness of the overcoat layer is not particularly limited, and is preferably, for example, from 0.1 to 10 μm.

4. Image Display Device

The image display device of the present invention includes the above-defined pressure-sensitive-adhesive-layer-attached polarizing film, and a transparent conductive layer in which the pressure-sensitive-adhesive-layer-attached polarizing film and the transparent conductive layer are bonded to each other. The state that "the pressure-sensitive-adhesive-layer-attached polarizing film and the transparent conductive layer are bonded to each other" may be a state that the two are bonded to each other to cause the pressure-sensitive adhesive layer of the pressure-sensitive-adhesive-layer-attached polarizing film to contact the transparent conductive layer; or the following state when the image display device has the overcoat layer on the transparent conductive layer: a state that the two are bonded to each other to cause the pressure-sensitive adhesive layer of the pressure-sensitive-adhesive-layer-attached polarizing film to contact the overcoat layer.

As described above, the pressure-sensitive-adhesive-layer-attached polarizing film of the present invention has the pressure-sensitive adhesive layer of the invention; accordingly, also when this pressure-sensitive-adhesive-layer-attached polarizing film is bonded to a (metal-mesh-containing) transparent conductive layer, restrainable are the corrosion of the (metal-mesh-containing) transparent conductive layer, a rise in the surface resistance of the (metal-mesh-containing) transparent conductive layer, and a deterioration in the external appearance thereof.

The pressure-sensitive-adhesive-layer-attached polarizing film of the present invention is preferably usable in, for example, the production of a substrate (member) as a constituent of the following instrument or a substrate (member) used in the instrument: for example, an image display device having an inputting device (such as a touch panel) (a liquid crystal display device, organic EL (electroluminescence) display device, PDP (plasma display panel) or electric paper piece); or an inputting device (such as a touch panel). The pressure-sensitive-adhesive-layer-attached polarizing film is preferably usable in the production of, particularly, an optical substrate for a touch panel. The polarizing film is usable regardless of the manner of the touch panel or any other inputting device, which is, for example, a resistive film manner or electrostatic capacity manner.

The pressure-sensitive-adhesive-layer-attached polarizing film of the present invention is usable as a substrate for optical devices (an optical member). The substrate for optical devices is not particularly limited as far as the substrate is a substrate having an optical property. The substrate is, for example, a substrate (member) as a constituent of the following instrument or a substrate (member) used in the instrument: for example, an image display device (such as a liquid crystal display device, organic EL (electroluminescence) display device, PDP (plasma display panel) or electric paper piece); or an inputting device (such as a touch panel).

Figure 2:
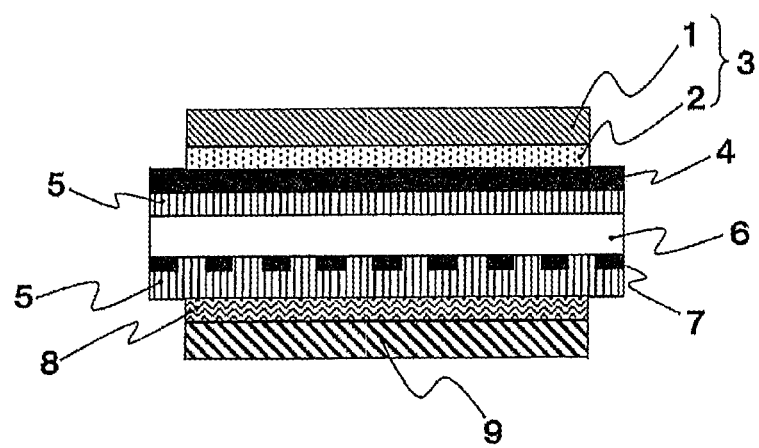
FIG. 2 is a sectional view that schematically illustrates one embodiment of the image display device of the invention.
Figure 3:
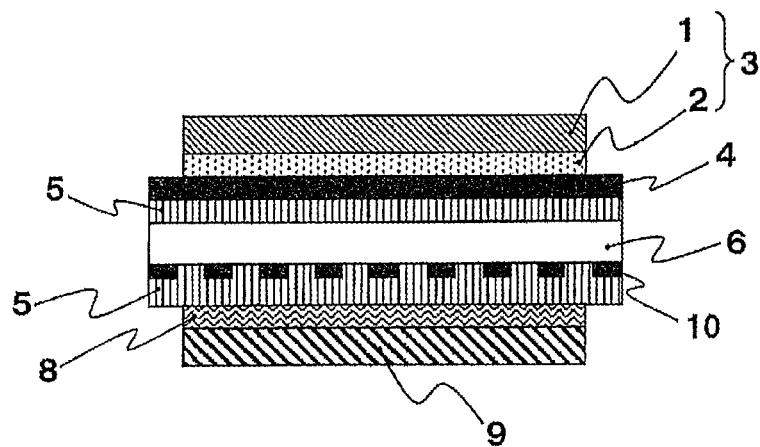
FIG. 3 is a sectional view that schematically illustrates one embodiment of the image display device of the invention.
Figure 4:
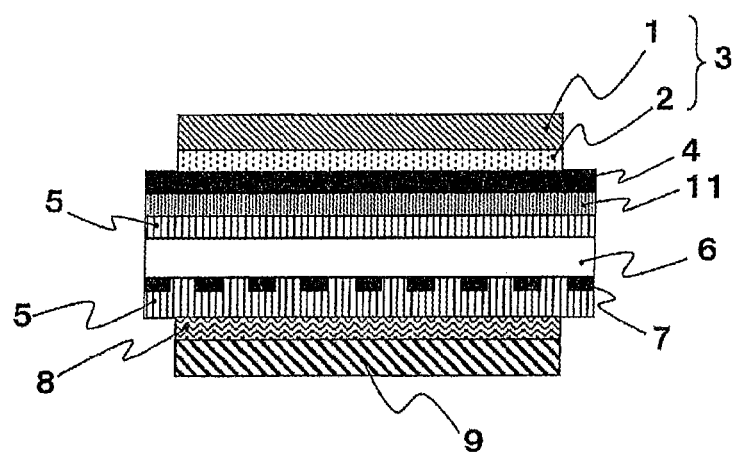
FIG. 4 is a sectional view that schematically illustrates one embodiment of the image display device of the invention.

A specific example of an image display device using the pressure-sensitive-adhesive-layer-attached polarizing film of the present invention is an image display device in which a transparent conductive film is used as an antistatic layer, or an image display device in which a transparent conductive film is used an electrode for a touch panel. Specifically, the image display device in which a transparent conductive film is used as an antistatic layer is, for example, an image display device as illustrated in FIG. 2, which has a structure composed of polarizing film 1/pressure-sensitive adhesive layer 2/transparent conductive layer 4/glass substrate 5/liquid layer 6/driving electrode 7/glass substrate 5/pressure-sensitive adhesive layer 8/polarizing film 9, the transparent conductive layer 4 functioning as an antistatic layer, and the driving electrode 7 being made of a transparent conductive layer. As the polarizing film 1/pressure-sensitive adhesive layer 2 in the upper side (viewing side) of this image display device, a pressure-sensitive-adhesive-layer-attached polarizing film 3 of the present invention is usable. The image display device in which a transparent conductive film is used as an electrode of a touch panel is, for example, an image display device which has a structure as illustrated in FIG. 3, which is composed of polarizing film 1/pressure-sensitive adhesive layer 2/transparent conductive layer 4/glass substrate 5/liquid crystal layer 6/sensor layer 10 functioning also as a driving electrode/glass substrate 5/pressure-sensitive adhesive layer 8/driving polarizing film 9 (in-cell type touch panel), or which has a structure as illustrated in FIG. 4, which is composed of polarizing film 1/pressure-sensitive adhesive layer 2/transparent conductive layer 4/sensor layer 11/glass substrate 5/liquid crystal layer 6/driving electrode 7/glass substrate 5/pressure-sensitive adhesive layer 8/polarizing film 9 (on-cell type touch panel), the transparent conductive layer 4 functioning as both of an antistatic layer and a sensor layer, and the sensor layer 11 and the driving electrode 7 being each made of a transparent conductive layer. As the polarizing film 1/pressure-sensitive adhesive layer 2 in the upper side (viewing side) of this image display device, a pressure-sensitive-adhesive-layer-attached polarizing film 3 of the present invention is usable. As the pressure-sensitive adhesive layer 8 and the polarizing film 9 in the lower side (backlight side) of the image display device, a pressure-sensitive adhesive layer and a polarizing film widely used in the present field are appropriately usable, respectively.

EXAMPLES

Hereinafter, the present invention will be specifically described by way of working examples thereof. However, the invention is not limited by these examples.

Production Example 1 (Preparation of Acrylic Polymer (A-1))

Into a four-necked flask equipped with stirring fans, a thermometer, a nitrogen gas introducing pipe, and a condenser was charged a monomer mixture containing 97.8 parts of butyl acrylate, 1.5 parts of N-vinylpyrrolidone, 0.4 parts of 4-hydroxybutyl acrylate, and 0.3 parts of acrylic acid. Furthermore, to 100 parts of the monomer mixture (solid) was charged 0.1 part of 2,2'-azoisobutyronitrile as a polymerization initiator together with ethyl acetate. While the liquid was gently stirred, nitrogen gas was introduced into the flask to purge the air with nitrogen. Thereafter, while the temperature of the liquid inside the flask was kept at about 55° C., polymerization reaction was conducted for 8 hours. Thereafter, ethyl acetate was added to the resultant reaction liquid to prepare a solution of an acrylic polymer (A-1) having a solid concentration adjusted to 20% and having a weight-average molecular weight of 1,600,000.

Production Example 2 (Preparation of Acrylic Polymer (A-2))

A solution of an acrylic polymer (A-2) having a weight-average molecular weight of 1,700,000 was prepared in the same way as in Production Example 1 except the use of a monomer mixture of 99 parts of butyl acrylate and 1 part of 4-hydroxybutyl acrylate as the monomer mixture.

Production Example 3 (Preparation of Acrylic Polymer (A-3))

A solution of an acrylic polymer (A-3) having a weight-average molecular weight of 1,900,000 was prepared in the same way as in Production Example 1 except the use of a monomer mixture of 97.5 parts of butyl acrylate, 2 parts of acrylic acid and 0.1 parts of hydroxyethyl acrylate as the monomer mixture.

The measurement of the weight-average molecular weight of each of the resultant (meth)acrylate polymers was according to the following method:

<Measurement of Weight-Average Molecular Weight of Each of (Meth)Acryl-Based Polymers (A)>

The weight-average molecular weight of the (meth)acryl-based polymer (A) was measured by GPC (gel permeation chromatography).

Analyzer: HLC-8120 GPC, manufactured by Tosoh Corp.,

Columns: G7000 $H_{XL}$+GMH$_{XL}$+GMH$_{XL}$, manufactured by Tosoh Corp.,

Column size: 7.8 mm in diameter×30 cm about each of the columns; total: 90 cm,

Column temperature: 40° C.,

Flow rate: 0.8 mL/min.,

Injection volume: 100 μL,

Eluent: tetrahydrofuran,

Detector: differential refractometer (RI), and

Standard sample: polystyrene.

Production Example 4 (Production of Polarizing Film)

A polyvinyl alcohol film of 80 μm thickness was put between two rolls different from each other in speed ratio to be stretched into a length three times the original length of the film while the film was dyed in an iodine solution having a concentration of 0.3% at 30° C. for 1 minute. Thereafter, while the film was immersed in a solution of boric acid and potassium iodide in water which had a concentration of 4% and 10%, respectively, at 60° C. for 0.5 minute, the film was stretched to give a total stretch ratio of 6. Next, the film was immersed in a potassium-iodide-containing solution in water which had a concentration of 1.5% at 30° C. for 10 seconds to be cleaned, and then dried at 50° C. for 4 minutes to yield a polarizer of 20 μm thickness. Triacetylcellulose films subjected to saponification treatment and each having a thickness of 40 μEt were bonded through a polyvinyl alcohol adhesive to both surface of the polarizer, respectively, to produce a polarizing film.

Example 1

(Preparation of Pressure-Sensitive Adhesive Composition)

The following were blended into 100 parts of solid in the acrylic polymer (A-1) yielded in Production Example 1 to prepare an acrylic pressure-sensitive adhesive solution: 1 part of butylmethylimidazolium bis(nonafluorobutanesulfonyl)imide (trade name: BMI N441, manufactured by Mitsubishi Materials Electronic Chemicals Co., Ltd.) as a conductive agent (B); 0.1 parts of an isocyanate crosslinking agent (trade name: TAKENATE D160N, trimethylolpropanehexamethylene diisocyanate, manufactured by Mitsui Chemicals, Inc.); 0.3 parts of benzoyl peroxide (trade name: NYPER BMT, manufactured by NOF Corp.); and 0.2 parts of γ-glycidoxypropylmethoxysilane (trade name: KBM-403, manufactured by Shin-Etsu Chemical Co., Ltd.).

(Production of Pressure-Sensitive-Adhesive-Layer-Attached Polarizing Film)

Next, a fountain coater was used to apply the acrylic pressure-sensitive adhesive solution uniformly onto a surface of a polyethylene terephthalate film (separator film), this surface being treated with a silicone release agent. The workpiece was dried in an air-circulating thermostatic oven of 155° C. for 1 minute to form a pressure-sensitive adhesive layer of 23 μm thickness on the surface of the separator film. Next, the pressure-sensitive adhesive layer famed on the separator was transferred onto the polarizing film produced in Production Example 4 to produce a pressure-sensitive-adhesive-layer-attached polarizing film.

Example 2 to 17, and Comparative Examples 1 to 9

In each of the examples, a pressure-sensitive-adhesive-layer-attached polarizing film was produced in the same way as in Example 1 except that in the preparation of the pressure-sensitive adhesive composition in Example 1, the kinds of the acrylic polymer and/or that of the conductive agent was/were changed as shown in Table 1. The addition amount of the conductive agent was an amount giving the same mole concentration as in Example 1.

About the pressure-sensitive-adhesive-layer-attached polarizing film yielded in each of the above-mentioned working examples and comparative examples, evaluations described below were made. The evaluation results are shown in Table 1.

<Corrosion Test>

The pressure-sensitive-adhesive-layer-attached polarizing film yielded in each of the working examples and the comparative examples was cut into a size of 15 mm×15 mm, and the separator film thereof was peeled off. The cut sample was bonded to a conductive glass piece having a surface on which an aluminum-based metal layer was formed, the layer having a thickness of 0.1 μm. Thereafter, the resultant was put in an autoclave at 50° C. and 5 atm. for 15 minutes. The resultant was used as a measuring sample. The resultant measuring sample was put in an environment of 60° C. temperature and 95% humidity for 500 hours, and then the external appearance of the metal layer of the sample was evaluated with the naked eye and through an optical microscope. About the size of the resultant defects, the longest moiety of the defects was measured.

⊙ Double circular mark: No defects were generated.

○ Circular mark: Defects (defect size: less than 0.5 mm) were slightly generated in a partial moiety of the circumference of the sample. However, the inside of the sample had no defects so that the sample was at such a level that no problem was caused.

Δ Triangular mark: Defects (defect size: 0.5 mm or more, and less than 1 mm) were intermittently generated in the circumference. However, the inside of the sample had no defects so that the sample was at such a level that no problem was caused.

x Cross mark: Continuous defects (defect size: 1 mm or more) were generated in the circumference, or the inside of the sample had defects so that the sample was at such a level that a problem was caused.

<Surface Resistivity Value>

The separator film of the pressure-sensitive-adhesive-layer-attached polarizing film yielded in each of the working examples and the comparative examples was peeled off from the polarizing film, and then an instrument, MCP-HT450, manufactured by Mitsubishi Chemical Analytech Co., Ltd. was used to measure the surface resistivity value (Ω/□) of the outer surface of the pressure-sensitive adhesive. The surface resistivity value is preferably less than $1.0 \times 10^{12}$ Ω/□.

TABLE 1

| | | | Conductive agent | | | | | | |
| | | | Cationic component | | Anionic component | | | | |
| | Acryl-Based polymer | Species | Total number of carbon atoms | MW | Total number of carbon atoms | MW | Total Mw | Corrosion test 60° C., 95% Rh 500 h | Surface resistivity (Ω/□) |
|---|---|---|---|---|---|---|---|---|---|
| Example 1 | A-1 | BMI-NFSI | 8 | 139 | 8 | 580 | 719 | ⊙ | 4.7E+11 |
| Example 2 | A-1 | BMPy-NFSI | 10 | 150 | 8 | 580 | 730 | ⊙ | 4.5E+11 |
| Example 3 | A-1 | MPP-NFSI | 8 | 128 | 8 | 580 | 708 | ⊙ | 6.0E+11 |

TABLE 1-continued

| | Acryl-Based polymer | Species | Cationic component | | Anionic component | | Total Mw | Corrosion test 60° C., 95% Rh 500 h | Surface resistivity (Ω/□) |
|---|---|---|---|---|---|---|---|---|---|
| | | | Total number of carbon atoms | MW | Total number of carbon atoms | MW | | | |
| Example 4 | A-1 | MTOA-TFSI | 25 | 368 | 2 | 280 | 648 | ⊙ | 5.4E+11 |
| Example 5 | A-1 | HMPy-TFSI | 12 | 178 | 2 | 280 | 458 | ○ | 4.3E+11 |
| Example 6 | A-1 | EMP-TFSI | 7 | 114 | 2 | 280 | 394 | ○ | 2.7E+11 |
| Example 7 | A-1 | MPP-TFSI | 8 | 128 | 2 | 280 | 408 | ○ | 5.1E+11 |
| Example 8 | A-1 | BMPp-TFSI | 10 | 156 | 2 | 280 | 436 | Δ | 4.8E+11 |
| Example 9 | A-2 | EMP-TFSI | 7 | 114 | 8 | 280 | 394 | Δ | 2.5E+11 |
| Example 10 | A-2 | BMI-NFSI | 8 | 139 | 8 | 580 | 719 | ○ | 4.6E+11 |
| Example 11 | A-2 | BMPy-NFSI | 10 | 150 | 8 | 580 | 730 | ○ | 3.9E+11 |
| Example 12 | A-2 | MTOA-TFSI | 25 | 368 | 2 | 280 | 648 | ⊙ | 5.2E+11 |
| Example 13 | A-1 | MTOA-NFSI | 25 | 368 | 8 | 580 | 948 | ⊙ | 7.4E+11 |
| Example 14 | A-1 | Li-NFSI | — | 6.9 | 8 | 580 | 587 | ○ | 4.0E+11 |
| Example 15 | A-1 | Dcpy-TFSI | 15 | 220 | 2 | 280 | 500 | ○ | 4.2E+11 |
| Example 16 | A-1 | MTOA-FSI | 25 | 368 | 0 | 180 | 548 | ○ | 3.8E+11 |
| Example 17 | A-3 | MTOA-TFSI | 25 | 368 | 2 | 280 | 648 | ○ | 7.0E+11 |
| Comparative Example 1 | A-1 | Li-TFSI | — | 6.9 | 2 | 280 | 287 | X | 1.8E+11 |
| Comparative Example 2 | A-1 | K-TFSI | — | 39 | 2 | 280 | 319 | X | 6.0E+11 |
| Comparative Example 3 | A-1 | TMA-TFSI | 4 | 74 | 2 | 280 | 354 | X | 6.0E+11 |
| Comparative Example 4 | A-1 | EMI-TF | 6 | 111 | 1 | 149 | 260 | X | 1.5E+12 |
| Comparative Example 5 | A-1 | MOPy-PF6 | 14 | 206 | — | 145 | 351 | X | 7.4E+11 |
| Comparative Example 6 | A-2 | Li-TFSI | — | 6.9 | 2 | 280 | 287 | X | 3.2E+11 |
| Comparative Example 7 | A-1 | — | — | — | — | — | — | ○ | OVER |
| Comparative Example 8 | A-1 | Li-FSI | — | 6.9 | 8 | 180 | 187 | X | 9.8E+10 |
| Comparative Example 9 | A-3 | Li-TFSI | — | 6.9 | 2 | 280 | 287 | X | 4.6E+11 |

In Table 1,
(A-1) is the acrylic polymer (A-1) produced in Production Example 1,
(A-2) is the acrylic polymer (A-2) produced in Production Example 2,
(A-3) is the acrylic polymer (A-3) produced in Production Example 3,
BMI-NFSI is butylmethylimidazolium bis(nonafluorobutanesulfonyl)imide,
BMPy-NFSI is N-butyl-methylpyridium bis(nonafluorobutanesulfonyl)imide,
MPP-NFSI is methylpropylpyrrolidium bis(nonafluorobutanesulfonyl)imide,
MTOA-TFSI is methyltrioctylammonium bis(trifluoromethanesulfonyl)imide,
HMPy-TFSI is hexylmethylpyridium bis(trifluoromethanesulfonyl)imide,
EMP-TFSI is ethylmethylpyrrolidium bis(trifluoromethanesulfonyl)imide,
MPP-TFSI is methylpropylpyrrolidium bis(trifluoromethanesulfonyl)imide,
BMPp-TFSI is butylmethylpyperidium bis(trifluoromethanesulfonyl)imide,
MTOA-NFSI is methyltrioctylammonium bis(nonafluorobutanesulfonyl)imide,
Li-NFSI is lithium bis(nonafluorobutanesulfonyl)imide,
Dcpy-TFSI is 1-decylpyridium bis(trifluoromethanesulfonyl)imide,
MTOA-FSI is methyltrioctylammonium bis(fluorosulfonyl)imide,
Li-TFSI is lithium bis(trifluoromethanesulfonyl)imide,
K-TFSI is potassium bis(trifluoromethanesulfonyl)imide,
TMA-TFSI is tetramethylammonium bis(trifluoromethanesulfonyl)imide,
EMI-TF is ethylmethylimidazolium trifluorosulfonate,
MOPy-PF6 is methyloctylpyridium hexafluorophosphate, and
Li-FSI is lithium bis(fluorosulfonyl)imide.

DESCRIPTION OF REFERENCE SIGNS

1: Polarizing film,
2: Pressure-sensitive adhesive layer,
3: Pressure-sensitive-adhesive-layer-attached polarizing film,
4: Transparent conductive layer,
5: Glass substrate,
6: Liquid crystal layer,
7: Driving electrode,
8: Pressure-sensitive adhesive layer,
9: Polarizing film,
10: Layer functioning as both of driving electrode and sensor, and
11: Sensor layer.

The invention claimed is:
1. An image display device, comprising a pressure-sensitive-adhesive-layer-attached polarizing film and a transparent conductive layer,
wherein the pressure-sensitive-adhesive-layer-attached polarizing film comprises a polarizing film, and a pressure-sensitive adhesive layer made from a pressure-sensitive adhesive composition comprising a (meth)acryl-based polymer (A) and a conductive agent (B) having a molecular weight of 380 or more, wherein the conductive agent (B) comprises an anion and a cation, wherein the anion is selected from the group consisting of a bis(trifluoromethanesulfonyl)imide anion, a bis(heptafluoropropanesulfonyl)imide anion, a bis(nonafluorobutanesulfonyl)imide anion, a bis(undecafluoropentanesulfonyl)imide anion, a bis(tridacafluorohexanesulfonyl)imide anion, and a bis(pentadecafluoroheptanesulfonyl)imide anion, and wherein the cation is selected from the group consisting of an ion of an alkali metal, a pyridinium cation, a piperidinium cation, a pyrrolidinium cation, a cation having a pyrroline skeleton, a cation having a pyrrole skeleton, a imidazolinium cation, a tetrahydropyridinium cation, a dihydropyridinium cation, a pyrazolium cation, a pyrazolinium cation, a tetraalkylammonium cation, a trialkylsulfonium cation, and a tetraalkylphosphonium cation, wherein the transparent conductive layer is an aluminum-based metal layer comprising a metal mesh, wherein the transparent conductive layer is on a viewer side of a sandwich comprising glass substrates and a liquid crystal layer, and wherein the pressure-sensitive-adhesive-layer-attached polarizing film is bonded to the transparent conductive layer.

2. The image display device according to claim 1, wherein the conductive agent (B) is an ionic compound having an anionic component and a cationic component, and the total number of carbon atoms in the anionic component is 6 or more.

3. The image display device according to claim 1, wherein the total number of carbon atoms in the cationic component of the conductive agent (B) is 6 or more.

4. The image display device according to claim 1, wherein the (meth)acryl-based polymer (A) comprises, as monomers for its monomer units, one or more monomers selected from the group consisting of carboxyl-group-containing monomers, hydroxyl-group-containing monomers and amide-group-containing monomers, and an alkyl (meth)acrylate.

5. The image display device according to claim 1, wherein the conductive agent (B) has a molecular weight of 600 or more.

* * * * *